US009461518B2

(12) United States Patent
Hata

(10) Patent No.: US 9,461,518 B2
(45) Date of Patent: *Oct. 4, 2016

(54) STEPPING MOTOR

(71) Applicant: MINEBEA CO., LTD., Kitasaku-gun, Nagano (JP)

(72) Inventor: Masato Hata, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 388 days.

This patent is subject to a terminal disclaimer.

(21) Appl. No.: 14/055,240

(22) Filed: Oct. 16, 2013

(65) Prior Publication Data

US 2014/0167534 A1 Jun. 19, 2014

(30) Foreign Application Priority Data

Dec. 19, 2012 (JP) ................................ 2012-276974

(51) Int. Cl.
*H02K 5/15* (2006.01)
*H02K 37/14* (2006.01)

(52) U.S. Cl.
CPC ................ *H02K 5/15* (2013.01); *H02K 37/14* (2013.01)

(58) Field of Classification Search
CPC .......... H02K 5/00; H02K 5/15; H02K 37/00; H02K 37/14; H02K 37/24; H02K 5/04; H02K 5/16
USPC ...................................................... 310/89, 91
See application file for complete search history.

(56) References Cited

U.S. PATENT DOCUMENTS 5,187,400 A * 2/1993 Kurata .................... H02K 3/525
310/49.12

| 7,183,676 | B2 * | 2/2007 | Mizumaki | ............... | H02K 1/145 |
| | | | | | 310/49.34 |
| 8,384,261 | B2 * | 2/2013 | Kinpara | .................... | H02K 5/15 |
| | | | | | 310/400 |
| 2002/0047466 | A1 * | 4/2002 | Mademba-Sy | .......... | H02K 5/15 |
| | | | | | 310/238 |

(Continued)

FOREIGN PATENT DOCUMENTS

JP Y-49-46003 12/1974
JP Y2-61-22473 7/1986

(Continued)

OTHER PUBLICATIONS

Jul. 29, 2016 Office Action issued in Japanese Patent Application No. 2012-276974.

*Primary Examiner* — Tran Nguyen
(74) *Attorney, Agent, or Firm* — Oliff PLC

(57) ABSTRACT

A stepping motor includes a first plate; a second plate having a side facing the first plate and a reverse side; a stator held by the first plate and the second plate axially; plural band connecting portions equipped in the first plate, disposed at a side surface of the stator, extending toward the second plate and having an engaging portion at an outer side thereof; and a band portion contacting the reverse side of the second plate, extending toward the first plate and having plural arm portions engaging respective engaging portions of the band connecting portion. The band portion is connected to the first plate while holding the second plate and the stator therebetween by engaging the plural arms with the engaging portions, the band portion is elastically deformed, the deformation causes tensile force in which the arm portions pull the band connecting portions toward the band portion.

10 Claims, 8 Drawing Sheets

(56) References Cited

U.S. PATENT DOCUMENTS

2003/0107284 A1* 6/2003 Wickham ................ H02K 5/00
                                              310/91
2011/0140558 A1  6/2011 Kinpara et al.
2011/0304225 A1* 12/2011 Terashita ................ H02K 5/04
                                              310/49.37
2013/0221795 A1* 8/2013 Hata ........................ H02K 5/15
                                              310/216.131

FOREIGN PATENT DOCUMENTS

| | | |
|---|---|---|
| JP | H09-191630 A | 7/1997 |
| JP | A-11-275848 | 10/1999 |
| JP | 2002-056753 | 2/2002 |
| JP | A-2011-125160 | 6/2011 |
| JP | A-2011-135661 | 7/2011 |

* cited by examiner

STEPPING MOTOR

BACKGROUND OF THE INVENTION

1. Field of the Invention

The present invention relates to a stepping motor having a structure for connecting a stator, a front plate, and an end plate.

2. Description of Related Art

Japanese Utility Model Publications Nos. 49-46003 and 61-224773 and Japanese Patent Applications Laid-open Nos. 11-275848, 2011-125160, and 2011-135661 are known as conventional techniques relating to a structure for connecting a stator, a front plate, and an end plate.

SUMMARY OF THE INVENTION

In the conventional techniques, parts must be fixed by welding, adhesion, or caulking, and improvements have been desired in view of manufacturing cost. In such circumstances, an object of the present invention is to provide a stepping motor in which a stator, a front plate, and an end plate are rigidly connected simply by assembling them.

The present invention provides a stepping motor comprising: a first plate; a second plate having a side facing the first plate and a reverse side; a stator axially held by the first plate and the second plate; plural band connecting portions provided in the first plate, disposed at a side surface of the stator, extending toward the second plate and having an engaging portion at an outer side thereof; and a band portion contacting the reverse side of the second plate, extending toward the first plate, and having plural arm portions engaging with respective engaging portions of the band connecting portion; wherein the band portion is connected to the first plate while holding the second plate and the stator therebetween by engaging the plural arm portions with the engaging portions, the band portion is elastically deformed, the deformation causes tensile force in which the arm portions pull the band connecting portions toward the band portion.

According to the present invention, the first plate, the stator, and the second plate are stacked axially, the band portion is installed from the second plate side, and the arm portion is engaged with the band connecting portion, whereby these members are connected in a condition in which the stator and the second plate are held between the first plate and the band portion. In this structure, the connecting condition of the members is fixed by engaging the arm portion of the band portion to the engaging portion of the first plate. Thus, the stator, and the front and end plates are connected by simply assembling the parts, and assembling the band portion thereafter. Furthermore, elasticity is produced by the elastic deformation of the arm portion, whereby force for holding the stator between the first plate and the second plate axially is produced, and the structure in which the stator is held between the first plate and the second plate axially is rigid.

According to a preferred embodiment of the present invention, the second plate has a relief portion allowing the elastic deformation of the band portion. In this embodiment, the elastic deformation of the band portion is facilitated.

According to a preferred embodiment of the present invention, the band portion has a reverse surface portion contacting the reverse side of the second plate and the plural arm portions axially extending from an outer ridge of the reverse surface portion, the second plate has a ridge portion facing a boundary between the plural arm portions and the reverse surface portion, the ridge portion has a shape in which the surface thereof is recessed, whereby the recessed surface functions as the relief portion. In this embodiment, the elastic deformation of the band portion is facilitated.

According to a preferred embodiment of the present invention, the stator has a projection or a recess, the first plate and the second plate have a recess or a projection, and the stator, the first plate, and the second plate are positioned by closely fitting the projection and the recess. It should be noted that the recess may be a concavity or a through hole into which the projection closely fits.

According to a preferred embodiment of the present invention, one of the band portion and the band connecting portion has a click portion, and the other of the band portion and the band connecting portion has a hanging portion to which the click portion hangs. In this embodiment, when the click portion is hung to the hanging portion, the band portion engages with the band connecting portion, whereby the first plate, the stator, and the second plate are connected.

According to a preferred embodiment of the present invention, the click portion has a contacting portion contacting the hanging portion, the contacting portion has a projection projecting axially at the outermost position from the axis. In this embodiment, the projection prevents the hanging portion from coming off, whereby the engagement of the click portion and the hanging portion is not easily released.

According to a preferred embodiment of the present invention, the click portion has a contacting portion contacting the hanging portion, the contacting portion has a recessed portion that is axially concave. In this embodiment, the hanging portion is hung to the recessed portion, whereby the engagement of the click portion and the hanging portion is not easily released. A shape in which a V-type or a U-type is turned at 90 degrees may be used as the recessed portion.

According to a preferred embodiment of the present invention, the plural arm portions are made of an elastic material, and when the plural arm portions are elastically deformed, the band portion can be removed from a condition engaging with the band connecting portion. In this embodiment, when the band portion is removed, engagement of the first plate, the stator, and the second is released, whereby the parts can be in pieces.

According to a preferred embodiment of the present invention, the stator has a cylindrical shape, the stepping motor further includes a rotor that is rotatably contained inside the stator, a rubber washer is disposed between the rotor and the first plate, and is disposed between the rotor and the second plate. In this embodiment, the rubber washer absorbs impacts of the rotor with respect to the first plate and the second plate caused by an axial gap. Because impacts are absorbed by the rubber washer, generation of sounds in rotation and noise caused by impacts from outside can be inhibited.

According to a preferred embodiment of the present invention, the plural engaging portions and the plural arm portions are disposed at equiangular positions when viewed axially. In this embodiment, the connecting structure by engaging the engaging portion with the arm portion can be stable.

According to a preferred embodiment of the present invention, the stepping motor further includes a circuit board, a means for mounting the circuit board to the first plate by contacting the circuit board to a end surface of the first plate, the engaging portion is located at a position apart from the end surface of the first plate toward the second plate, and the end of the arm portion does not reach the end surface of the first plate. In this embodiment, in the structure for mounting the circuit board to the first plate by contacting the circuit board to the first plate, the engaging portion and the arm portion do not interfere with the circuit board. Since the engagement of the engaging portion and the arm portion is carried out at a side surface of the stepping motor, the circuit board does not disturb the operation for releasing the engagement.

According to the present invention, a stepping motor in which a stator, a front plate, and an end plate are rigidly connected simply by assembling them is obtained.

PREFERRED EMBODIMENTS OF THE INVENTION

Overall Structure

Figure 2:
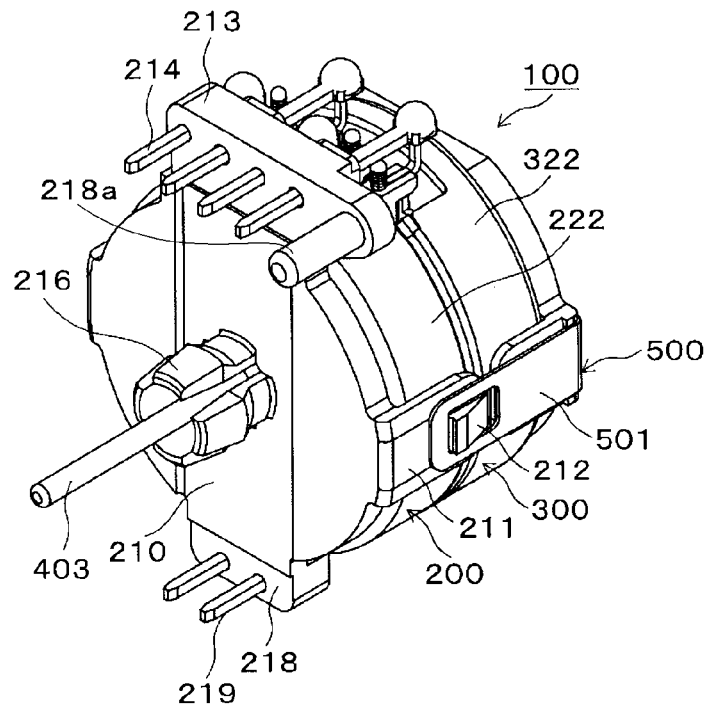
FIG. 2 is a perspective view of the stepping motor of an embodiment.
Figure 3:
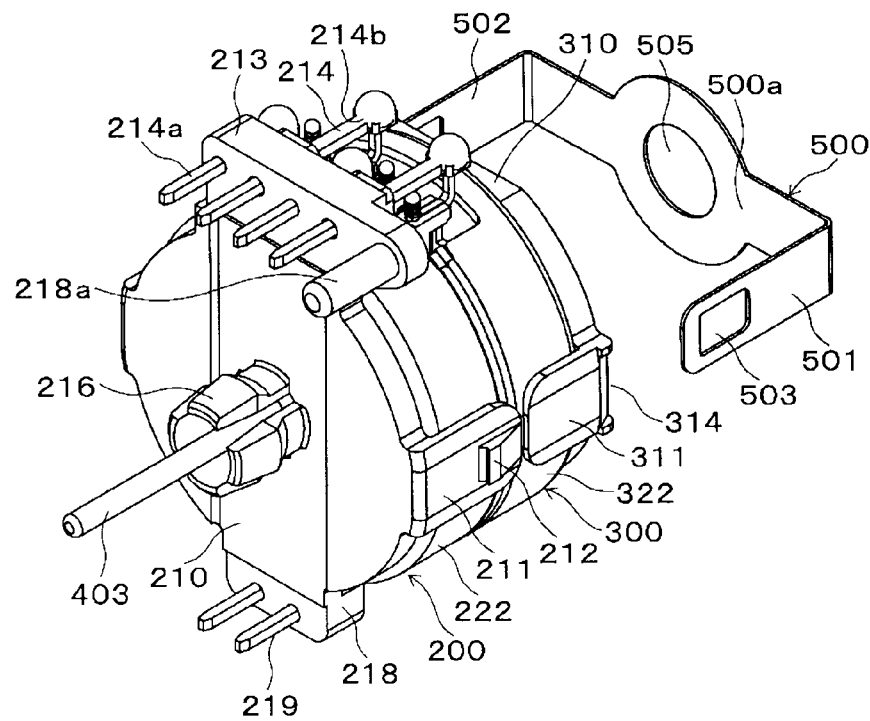
FIG. 3 is an exploded perspective view of the stepping motor of an embodiment.
Figure 4:
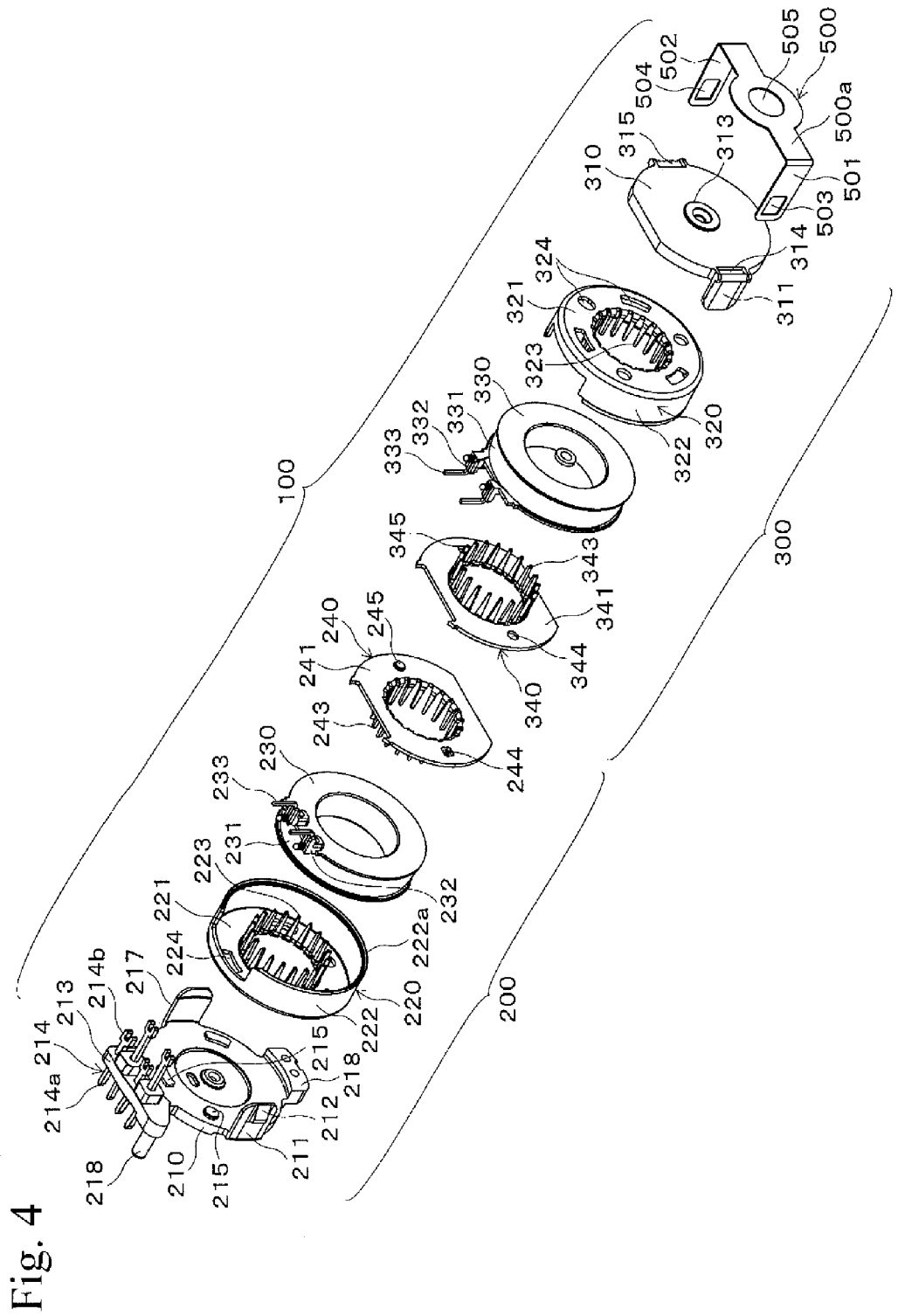
FIG. 4 is an exploded perspective view of the stepping motor of an embodiment.
Figure 5:
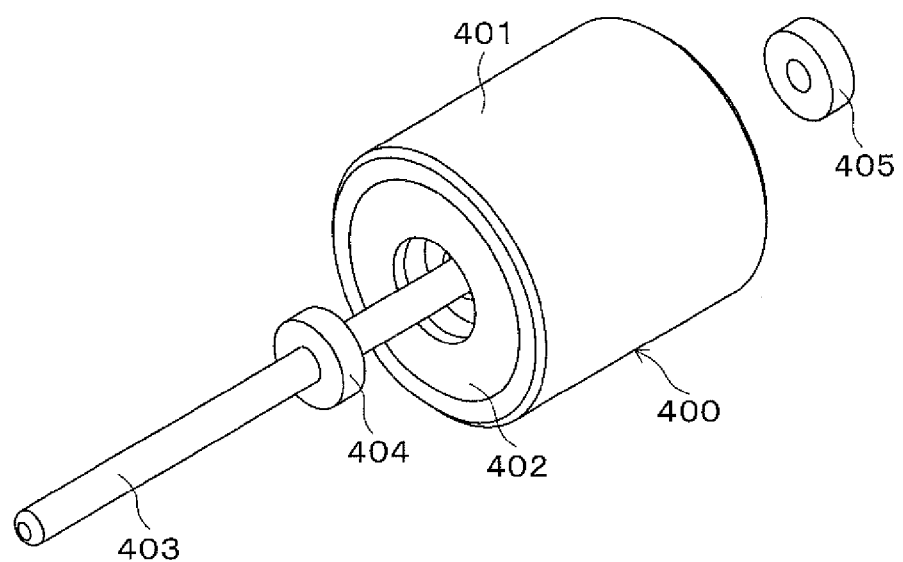
FIG. 5 is a perspective view of a rotor of an embodiment.

FIG. 1 to FIG. 4 show a stepping motor 100 of an embodiment. The stepping motor 100 is a claw-pole stepping motor. As shown in FIG. 4, the stepping motor 100 has a stator structure in which a front side stator assembly 200 and an end side stator assembly 300 are connected axially. As shown in FIG. 5, a rotor 400 is rotatably contained in the stator structure.

Structure of Front Side Stator Assembly 200

As shown in FIG. 4, the front side stator assembly 200 includes a front plate 210, an outer stator 220, a bobbin 230, and an inner stator 240. The front plate 210 (one example of a first plate) is a substantially circular plate composing a front housing, and is formed of an injected resin. The front plate 210 has a band connecting portion 211 axially extending from an outer ridge of the substantially circular plate. The band connecting portion 211 includes a click portion 212. A band connecting portion 217 having the same structure as the band connecting portion 211 is also provided at the opposite side along the axis. The band connecting portion 211 engages with a band 500 described below. When the band connecting portion 211 engages with the band 500, the connected condition of the front side stator assembly 200 and the end side stator assembly 300 in an axial direction is fixed.

The front plate 210 has a terminal portion 213. Four metallic terminal pins 214 are embedded in the terminal portion 213. The terminal pin 214 has an end portion 214a that is connected to a circuit board (not shown) and an end portion 214b that contacts terminals 233 and 333 connected to wirings extending from stator coils 231 and 331. The front plate 210 has a terminal portion 218. Two terminal pins 219 are embedded in the terminal portion 218.

Plural bosses 215 are provided to the front plate 210. The boss 215 is a projection projecting toward an outer stator 220, described below, and plural bosses 215 having two kinds of shapes are arranged. When the bosses 215 are closely fitted into a hole portion 224 provided in a ring portion 221 of the outer stator 220, the front plate 210 and the outer stator 220 are connected to each other axially, and a rotation-stop structure preventing relative rotation of both is obtained. The hole portion 224 is a through hole penetrating to the reverse side, and functions as a recess into which the projecting boss closely fits. The hole portion 224 can be a concavity having a bottom. This structure can be applied to other hole portions.

Figure 1:
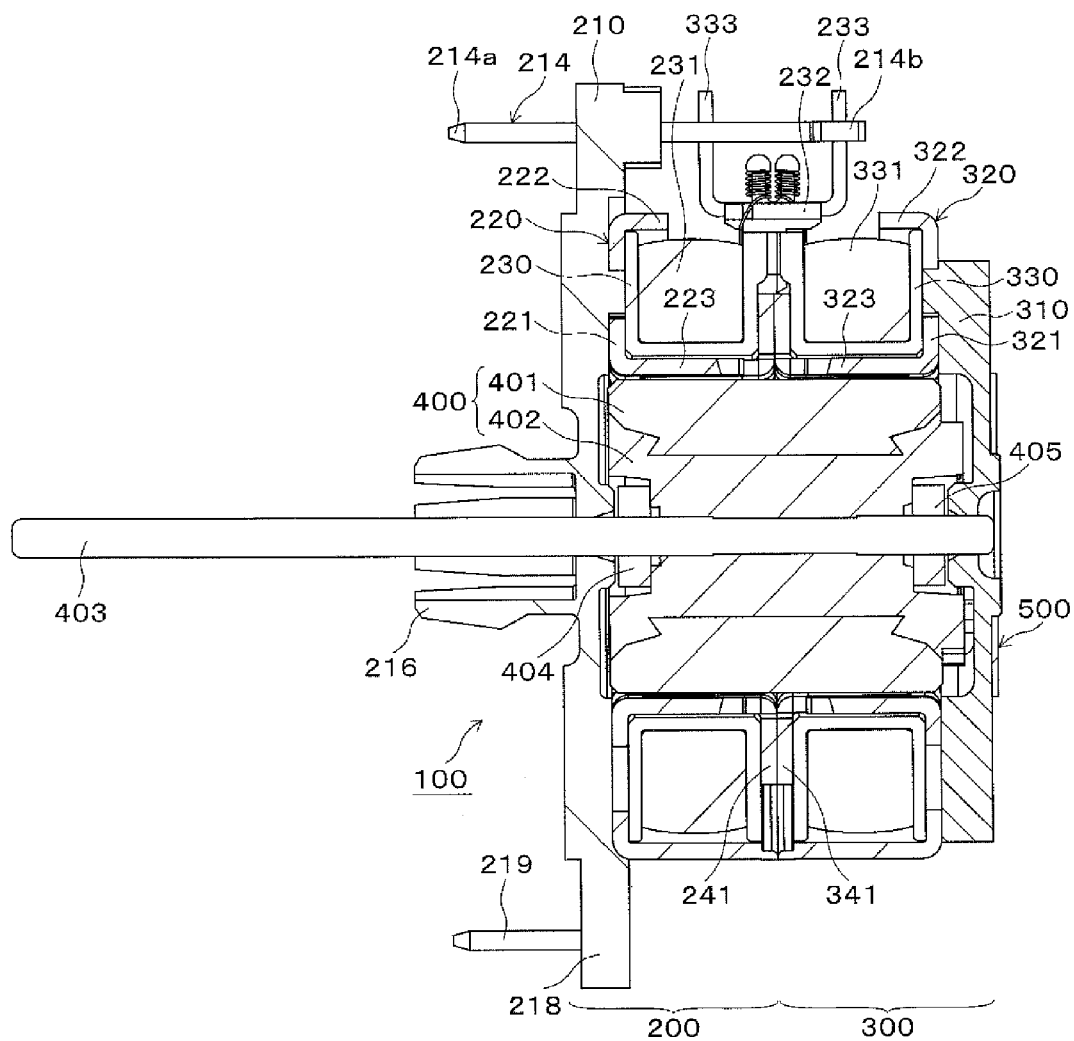
FIG. 1 is a cross sectional view showing a stepping motor of an embodiment of the present invention.

As shown in FIGS. 1 to 3, the front plate 210 is provided with a circuit board mounting boss 216 which has axially extending plural slits. The circuit board mounting boss 216 is press inserted into a hole of a circuit board (not shown), thereby mounting the stepping motor 100 to the circuit board. When the stepping motor 100 is mounted to a circuit board by the circuit board mounting boss 216, the end portions 214a of the four terminal pins 214 contact the circuit board and the terminal pins 214 are soldered to a wiring pattern on the circuit board. The two terminal pins 219 are also connected to the circuit board. Reference numeral 218a indicates a positioning pin for positioning the stepping motor 100 with respect to the circuit board. When the positioning pin 218a is closely fitted into a positioning hole provided in the circuit board, the stepping motor 100 is positioned with respect to the circuit board.

The outer stator 220 functions as a stator in which a magnetic path is generated and is formed of a magnetic material such as electromagnetic soft iron or rolled steel sheets. The outer stator 220 comprises the ring portion 221 having a planar plate-like shape, an outer cylindrical portion 222 axially extending from the outer ridge of the ring portion 221, pole teeth 223 axially extending from the inner ridge of the ring portion 221 and circumferentially arranged at intervals.

The bobbin 230 is made of a resin and wound with the stator coil 231. The bobbin 230 wound with the stator coil 231 is located in a ring-shaped space between the outer cylindrical portion 222 and the pole teeth 223 of the outer stator 220. The bobbin 230 has two terminal portions 232. The metallic terminal 233 is embedded in each terminal portion 232. An end portion of the wire of the stator coil 231 is connected to the terminal 233. The two end portions 214b of the four terminals 214 are connected to the two terminals 233 respectively.

The inner stator 240 is made of the same material as the outer stator 220 and has a planar plate-shaped ring portion 241 and pole teeth 243 axially extending from the inner ridge of the ring portion 241 and circumferentially arranged at intervals. The outer circumference of the ring portion 241 contacts the inner circumferential surface of the outer cylindrical portion 222 of the outer stator 220. The inner side of the ridge portion of the outer cylindrical portion 222 is formed with a step portion 222a to which the outer circumference of the ring portion 241 contacts. The ring portion 241 is fitted to the outer cylindrical portion 222, whereby the outer circumference of the ring portion 241 stably contacts the inner circumferential surface of the outer cylindrical portion 222.

In a condition in which the inner stator 240 is assembled to the outer stator 220 while holding the bobbin 230 therebetween, the pole teeth 223 and 243 are positioned inside the bobbin 230 and alternately engage with each other with a gap therebetween. The ring portion 241 of the inner stator 240 is provided with a hole portion 244, into which a boss 344 of the end side stator assembly 300 is closely fitted. When the boss 344 is closely fitted into the hole portion 244, the front side stator assembly 200 and the end side stator assembly 300 are connected axially, and a rotation-stop structure preventing relative rotation of both is obtained. A boss 245 is provided at the opposite side of the hole portion 244 with the axis. The boss 245 is closely fitted into a hole portion 345 provided in the end side stator assembly 300 side.

Structure of End Side Stator Assembly 300

As shown in FIG. 4, the end side stator assembly 300 is composed of an end plate 310, an outer stator 320, a bobbin 330, and an inner stator 340. The outer stator 320 is the same part as the outer stator 220, and is used in the opposite axial direction with respect to the outer stator 220. The bobbin 330 is the same part as the bobbin 230, and is used in the opposite axial direction with respect to the bobbin 230. The inner stator 340 is the same part as the inner stator 240, and is used in the opposite axial direction with respect to the inner stator 240.

Figure 7:
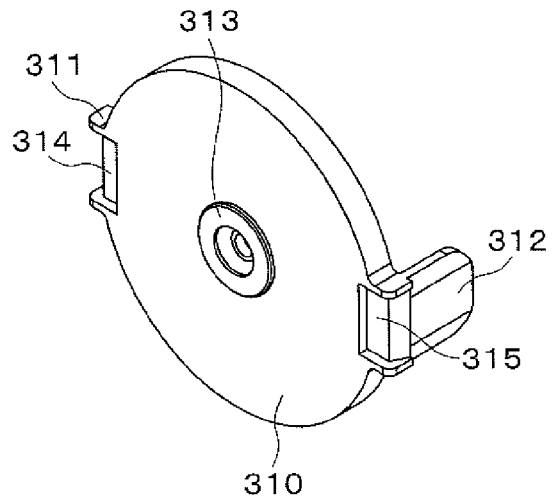
FIG. 7 is a perspective view of an end plate of an embodiment.

FIG. 7 shows the end plate 310. The end plate 310 (one example of a second plate) is a substantially circular plate composing an end housing, and is formed of the injected resin. A boss 313 is provided at the center of the end plate 310, and the center of the boss 313 is formed with a hole through which a shaft 403 penetrates. The end plate 310 has a band contacting portion 311 that contacts an arm portion 501 of the band 500 from inside. The band contacting portion 311 supports the arm portion 501 from inside, thereby preventing releasing of the arm portion 501 from the end plate 310 when the arm portion 501 is deformed after assembling. A band contacting portion 312 having the same function is provided at the opposite side of the band contacting portion 311 with the axis. The end plate 310 is provided with a boss (not shown) that is closely fitted into a hole portion 324 provided in the outer stator 320.

The band contacting portions 311 and 312 axially extend from the outer ridges of the end plate 310, and the corner portions (base portions) thereof have relief portions 314 and 315. The relief portions 314 and 315 are spaces in which the band 500 does not contact the end plate 310 and the band contacting portions 311 and 312.

That is, the band 500 has a reverse surface portion 500a which contacts the side of the end plate 310 opposite to the side facing the front plate 210, and arm portions 501 and 502 axially extending from the outer ridges of the reverse surface portion 500a. The ridge portions of the end plate 310 facing the boundaries between the arm portions 501 and 502 and the reverse surface portion 500a have a shape in which the surface is recessed, and the recessed portion composes the relief portion 314 or 315. In the relief portions 314 and 315, the boundaries between the reverse surface portion 500a of the band 500 and the arm portions 501 and 502 has a gap from the outer ridges of the end plate 310, whereby elastic deformation of the band 500, as described below, is possible. That is, in the relief portions 314 and 315, the reverse surface portion 500a and the arm portions 501 and 502 do not contact the end plate 310, and a gap is formed between the reverse surface portion 500a, and the arm portions 501 and 502.

The outer stator 320 includes a ring portion 321 having a planar plate-like shape, an outer cylindrical portion 322 axially extending from the outer ridge of the ring portion 321, and pole teeth 323 axially extending from the inner ridge of the ring portion 321 and circumferentially arranged at intervals.

The bobbin 330 is made of a resin and is wound with the stator coil 331. The bobbin 330 wound with the stator coil 331 is located in a space between the outer cylindrical portion 322 and the pole teeth 323 of the outer stator 320. The bobbin 330 has two terminal portions 332. The metallic terminal 333 is embedded in each terminal portion 332. An end portion of the wire of the stator coil 331 is connected to the terminal 333. The two end portions 214b of the four terminals 214 are connected to the two terminals 333 respectively.

The inner stator 340 is made of the same material as the outer stator 320 and has a planar plate-shaped ring portion 341 and pole teeth 343 axially extending from the inner ridge of the ring portion 341 and circumferentially arranged at intervals. The outer circumference of the ring portion 341 contacts the inner circumferential surface of the outer cylindrical portion 322 of the outer stator 320. The inner side of the ridge portion of the outer cylindrical portion 322 is formed with the same step portion as indicated by numeral 222a to which the outer circumference of the ring portion 341 contacts.

In a condition in which the inner stator 340 is assembled to the outer stator 320 while holding the bobbin 330 therebetween, the pole teeth 323 and 343 are positioned inside the bobbin 330 and alternately engage with each other with a gap therebetween. The ring portion 341 of the inner stator 340 is provided with the boss 344 and the hole portion 345. The boss 344 is closely fitted into the hole portion 244 of the front side stator assembly 200, and the boss 245 of the front side stator assembly 200 is closely fitted into the hole portion 345.

Structure of Band

The band 500 is a substantially C-shaped member made of a metallic material having properties of a spring. The band 500 has the reverse surface portion 500a, which contacts the side of the end plate 310 opposite to the side facing the front plate 210, and arm portions 501 and 502 axially extending from the outer ridges of the reverse surface portion 500a. The reverse surface portion 500a of the band 500 is provided with a hole portion 505. The boss 313 of the end plate 310 is closely fitted into the hole portion 505. The band 500 has the arm portions 501 and 502 axially extending at outer ridges thereof. The arm portion 501 is provided with a rectangular hole portion 503. The click portion 212 of the band connecting portion 211 equipped in the front plate 210 is hung to the hole portion 503, whereby the band connecting portion 211 and the arm portion 501 is connected. Similarly, the arm portion 502 is provided with a rectangular hole portion 504. A click portion (not shown in the figures) of the band connecting portion 217 of the front plate 210 is hung to the hole portion 504.

The dimensions of portions are set so that the engagement of the band connecting portion 211 with the hole portion 503 and the engagement of the band connecting portion 217 with the hole portion 504 are tight. That is, the dimensions of portions are set so that tensile force is loaded to arm portions 501 and 502 in the engagement. In this condition, force in which the arm portions 501 and 502 strongly pull the front plate 210 is generated, whereby parts composing the stator are rigidly held and unified between the band 500 and the front plate 210. Specifically, in this structure, the arm portions 501 and 502 are pulled toward the band connecting portions 211 and 217, and the band 500 is elastically bent at the relief portions 314 and 315. The elastic force causes tensile force in which the arm portions 501 and 502 pull the band connecting portions 211 and 217 toward the band 500. By this tensile force, the front plate 210 and the end plate 310 are axially pulled toward each other while holding parts therebetween, and these parts are rigidly assembled. Since the force for assembly is caused by the resilient force in which the elastic deformation of the band 500 is restored to the original condition, the band 500 is not easily relaxed.

In the assembled condition as shown in FIG. 2, when viewed from the end plate 310 (viewing angle of FIG. 4), the front ends of the arm portions 501 and 502 do not reach the end surface of the front plate 210, and the engaging portion of the arm portion 501 with respect to the band connecting portion 211 also does not reach the end surface of the front plate 210. That is, the front ends of the arm portions 501 and 502 and the engaging portion of the arm portion 501 with respect to the band connecting portion 211 are positioned at positions which are apart from the end surface of the front plate 210 toward the end plate 310. Such a structure is the same as in the band connecting portion 217 side.

The arm portions 501 and 502 and the band connecting portions 211 and 217 are disposed at equiangular positions (angular position of 180 degrees in this case) when viewed axially. By this structure, the fixing structure using the band 500 is stable. It should be noted that the number of the engagements is not limited in two, but may be three or more. For example, in the case in which the arm portions and the band connecting portions are provided at three positions, the positions are preferably located at 120 degrees when viewed from the axis.

Structure of Rotor

FIG. 5 shows the rotor 400. The rotor 400 has a cylindrical rotor magnet 401. The rotor magnet 401 is fixed on an outer circumference surface of a rotor member 402 and has a magnetic pole that is alternately magnetized, such as NSNS, circumferentially. The shaft 403 as a rotational axis is fixed in the axial center of the rotor 400 (the rotor member 402). As shown in FIG. 1, the shaft 403 is inserted into a hole provided in the front plate 210 and the end plate 310 and directly contacted the inner circumferential surface thereof, thereby being rotatably supported. The shaft 403 may be rotatably supported by the front plate 210 and the end plate 310 via a bearing device such as an anti-friction bearing.

The shaft 403 is installed with cylindrical rubber washers 404 and 405. The rubber washer 404 is located between the rotor 400 and the front plate 210, and the rubber washer 405 is located between the rotor 400 and the end plate 310. The rubber washers 404 and 405 absorb impact caused by a gap in the rotor 400.

Sample of Process of Assembling

An example of a process of assembling the stepping motor 100 will be explained hereinafter. As shown in FIG. 4, the stator coil 231 is wound beforehand at the bobbin 230 and is connected to the terminal 233. The same process is carried out for the bobbin 330. The front side stator assembly 200 and the end side stator assembly 300 are assembled in the following manner.

First, the outer stator 220 and the inner stator 240 are axially combined while holding the bobbin 230 therebetween. Then, the outer stator 220 and the front plate 210 are axially combined. In this process, the boss 215 is closely fitted into the hole portion 224, thereby positioning the outer stator 220 (and inner stator 240) and the front plate 210 circumferentially and obtaining a rotation-stop structure around the axis. Thus, the front side stator assembly 200 is obtained.

The outer stator 320 and the inner stator 340 are axially combined while holding the bobbin 330 therebetween. Then, the outer stator 320 and the end plate 310 are axially combined. In this process, the boss (not shown) of the end plate 310 side is closely fitted into the hole portion 324, thereby positioning the outer stator 320 (and inner stator 340) and the end plate 310 circumferentially and obtaining a rotation-stop structure around the axis. Thus, the end side stator assembly 300 is obtained.

Then, the front side stator assembly 200 and the end side stator assembly 300 are axially contacted with each other while the rotor 400 is contained therein. In this process, the boss 344 is closely fitted into the hole portion 244 and the boss 245 is closely fitted into the hole portion 345 (see FIG. 4). Thus, the front side stator assembly 200 and the end side stator assembly 300 are positioned around the axis, and a rotation-stop structure around the axis is obtained. Then, as shown in FIG. 3, the band 500 is installed from the side of the end side stator assembly 300, and the inner edge of the hole portion 503 is hung to the click portion 212, thereby engaging. The same engagement is carried out in the hole portion 504. In this process, the band 500 is elastically deformed at the relief portions 314 and 315. Thus, the band 500 is fixed to the front plate 210, and the parts composing the stator are held between the band 500 and the front plate 210, whereby these parts are unified.

The stepping motor 100 has a structure in which the stator is axially held between the front plate 210 and the end plate 310. In the embodiment, the stator is composed of the outer stator 220, the bobbin 230, the inner stator 240, the outer stator 320, the bobbin 330, and the inner stator 340. The front plate 210 has the band connecting portions 211 and 217. The band 500 contacts the side of the end plate 310 opposite to the side facing the front plate 210. The band connecting portions 211 and 217 are positioned at side surfaces of the stator, extend toward the end plate 310, and comprise the click portions 212 at outside. The band 500 comprises the arm portions 501 and 502 extending toward the front plate 210 and engaging with the click portions 212 of the band connecting portions 211 and 217. By the engagement of the arm portions 501 and 502 with the click portions 212, the band 500 is combined with the front plate 210 while holding the end plate 310 and the stator therebetween. The band 500 is elastically deformed at the relief portions 314 and 315, and the elastic deformation causes tensile force in which the arm portions 501 and 502 pull the band connecting portions 211 and 217 toward the band 500.

According to the structure, the parts are unified by assembling the parts and installing the band 500 finally, thereby obtaining the structure shown in FIGS. 1 and 2. In this process, operation for fixing by welding or calking is not needed but the parts are fixed by contacting and combining the parts and installing the band 500 finally. Therefore, the operation is simplified and machine apparatuses for welding and calking are not needed. Specifically, since the structure of the band 500 is simple, the assembling can be performed with high accuracy and stability.

Figure 6A:
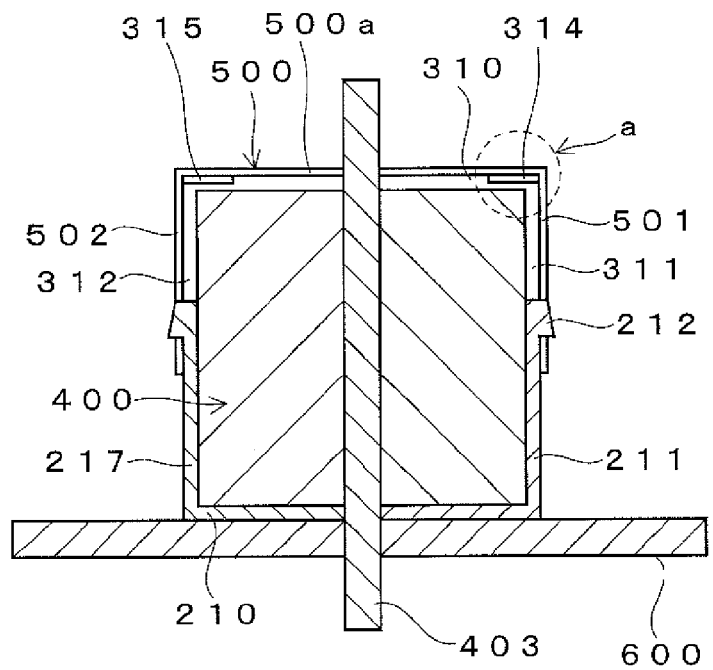
FIG. 6A is a schematic view showing a condition in which a band is elastically deformed.
Figure 6B:
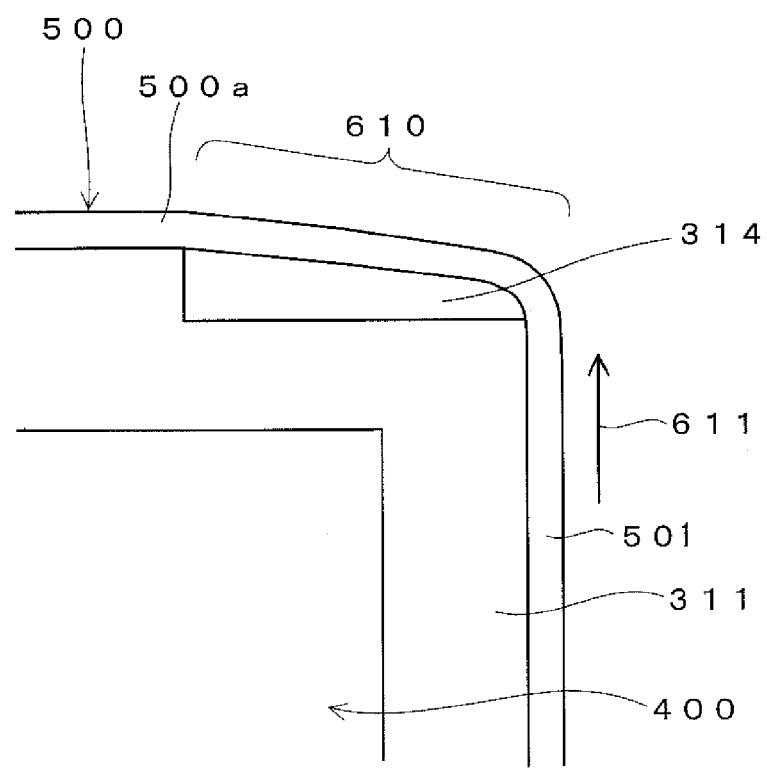
FIG. 6B is an enlarged view of the main portion of FIG. 6A.

Since the end plate 310 has the relief portions 314 and 315, the band 500 is not easily relaxed. This function is explained in detail hereinafter. FIG. 6A shows a schematic view of the embodiment of the stepping motor 100. FIG. 6B shows an enlarged view of the portion "a" encircled by a dotted line in FIG. 6A.

As mentioned above, the dimensions of the portions are set so that the engagement of the band connecting portion 211 with the hole portion 503 and the engagement of the band connecting portion 217 with the hole portion 504 are tight. Therefore, in the assembled condition, downward tensile force in FIGS. 6A and 6B is loaded to the arm portions 501 and 502. In this condition, since the relief portions 314 and 315 are provided, a portion 610 of the band 500 is elastically deformed, as shown in FIG. 6B. The same function is obtained in the relief portion 315. The portion 610 is exaggeratedly drawn to show the condition of the elastic deformation of the band 500.

When the band 500 is elastically deformed at the portion 610, the arm portion 501 is pulled upward (direction shown by an arrow 611 in FIG. 6B), whereby the front plate 210 is pulled upward by the band 500 via the click portion 212. That is, by the elastic deformation of the band 500 at the portion 610, the front plate 210 and the end plate 310 are pulled toward each other axially and are assembled.

If the relief portions 314 and 315 are not provided, there is no place for elastic deformation of the band 500, and engagement of the band connecting portions 211 and 217 with the hole portions 503 and 504 is difficult. If the engagement is forcibly performed, the arm portions 501 and 502 may open outward. Even though the engagement is completed, the arm portions 501 and 502 may open afterward and the engagement may be released. In contrast, in the case of having the relief portions 314 and 315, the combining structure of the front plate 210 and the end plate 310 is not easily relaxed due to the elastic force caused by the elastic deformation of the band 500.

According to the embodiment, as shown in FIG. 4, the structure for positioning and rotation-stop is obtained by closely fitting the boss into the hole portion, the relationship of positions between the parts is accurately set by the easy operation of simply assembling parts in order. The band 500 has the properties of a spring, whereby the band 500 can be removed after assembling. By removing the band 500, the parts that are merely contacting can be removed, whereby replacement and recycling of parts can be facilitated. For example, in a condition in which the stepping motor 100 is attached to the circuit board, the band 500 can be removed and the rotor 400 can be removed. Since the rotor 400 can be removed, dismantling, repair, and recycling can be performed in all uses, not just for office equipment, factory automation, and vehicles.

The stepping motor 100 is directly attached to the circuit board, whereby space-saving is achieved. Since the rubber washers 404 and 405 are used, impact caused by a gap in the axial direction is absorbed.

Since the click portion 212 is located at the position apart from the end surface of the front plate 210, in the condition in which the front plate 210 is pushed and contacted to the circuit board, the click portion 212 and arm portions 501 and 502 of the band 500 do not interfere with electric parts on the circuit board, thereby space for package parts on the circuit board is secured. Since the ends of the arm portions 501 and 502 do not reach the end surface of the front plate 210 when viewed from the end plate 310, in the condition in which the front plate 210 is pushed to the circuit board, the engagement of the arm portion 501 with the band connecting portion 211 can be released and the band 500 can be removed.

Modified Embodiment

Figure 8A:
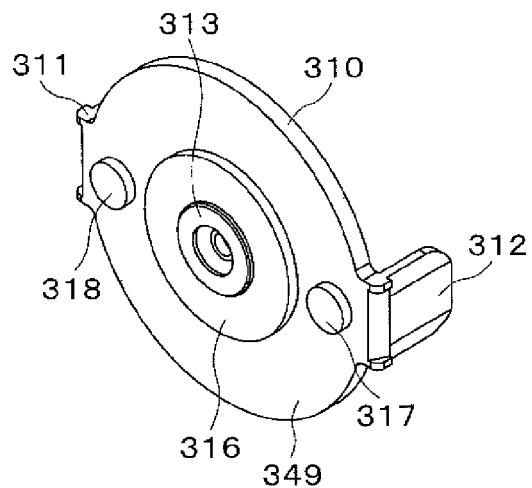
FIG. 8A is a perspective view of an end plate of another embodiment.

FIG. 8A shows another embodiment of the end plate 310. In the embodiment shown in FIG. 8A, a bulge portion 316 is provided in the vicinity of the center, and the radially outer ring-shaped portion thereof is slightly lower than the bulge portion 316 and functions as a relief portion 349. Bosses 317 and 318 are disposed on the relief portion 349, which support the band 500. In this embodiment, the band 500 can be deformed as in the abovementioned embodiment, and the same effects can be obtained.

Figure 8B:
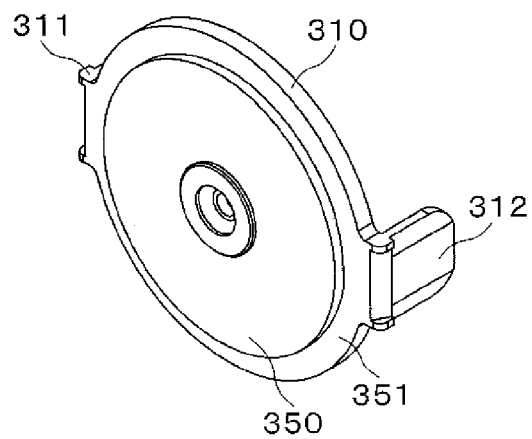
FIG. 8B is a perspective view of an end plate of a further embodiment.

FIG. 8B shows another embodiment of the end plate 310. In the embodiment shown in FIG. 8B, a bulge portion 350 has a larger diameter than that of the bulge portion 316, and the radially outer ring-shaped portion thereof is slightly lower than the bulge portion 350 and functions as a relief portion 351. In this embodiment, the band 500 can be deformed as in the abovementioned embodiment, and the same effects can be obtained.

Figure 9A:
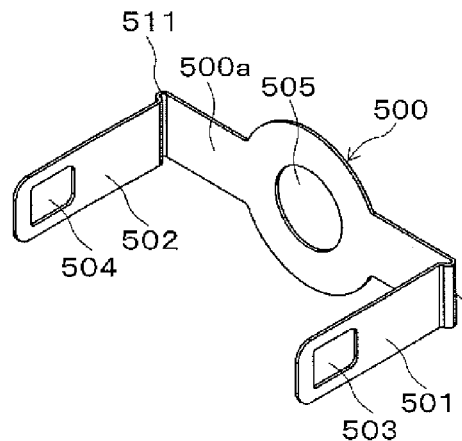
FIG. 9A is a perspective view of a band of an embodiment.
Figure 9B:
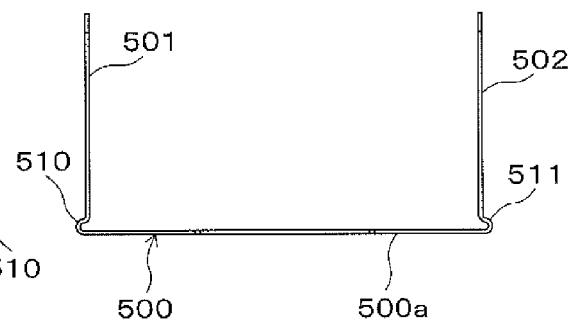
FIG. 9B is a top view of the band.

FIGS. 9A and 9B show an embodiment in which round-shaped bent portions 510 and 511 are provided to the band 500. In this embodiment, the extent of the deformation of the band 500, which allows displacement of the arm portions 501 and 502 in the axial direction, can be largely ensured. When the band 500 is elastically deformed and elastic force is loaded to the arm portions 501 and 502, the arm portions 501 and 502 easily be parallel to the axis, whereby the front plate 210 and the end plate 310 can be rigidly combined. In this structure, since the bent portions 510 and 511 are provided, elastic deformation of the band 500 in the assembled condition is ensured even though the relief portions 314 and 315 are omitted.

Figure 10A:
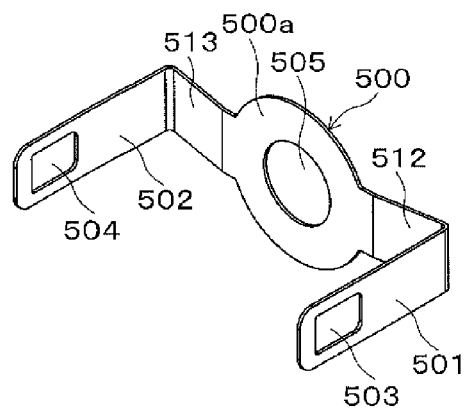
FIG. 10A is a perspective view of a band of another embodiment.
Figure 10B:
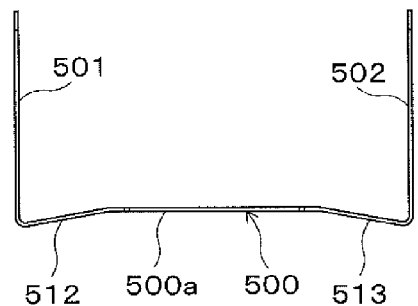
FIG. 10B is a top view of the band.

FIGS. 10A and 10B show an embodiment in which both sides of the reverse surface portion 500a are formed with folding portions 512 and 513 which are folded in the direction away from the front plate 210. In this embodiment, the extent of the deformation of the band 500, which allows displacement of the arms 501 and 502 in the axial direction, can be largely ensured. In this structure, elastic deformation of the band 500 in the assembled condition is ensured even though the relief portions 314 and 315 are omitted.

Other Embodiments

The outer stators 220 and 320 may be provided with recesses into which the band connecting portions 211 and 217 and the band contacting portions 311 and 312 are closely fitted. The boss 313 of the end plate 310 may be welded to the band 500 after the boss 313 is closely fitted into the hole portion 505. In the above embodiment, the band 500 is engaged with the front plate 210 at two points. The same engaging structure may be provided at three points or more. The click portion 212 may be provided to the band contacting portions 311 and 312 of the end plate 310, the band 500 may be installed from the front plate 210 side, thereby combining the whole parts. The inner side of the arm portions 501 and 502 of the band portion 500 may be provided with the click portion 212, the band connecting portions 211 and 217 may be provided with a portion to which the click portion 212 is hung.

Figure 11A:
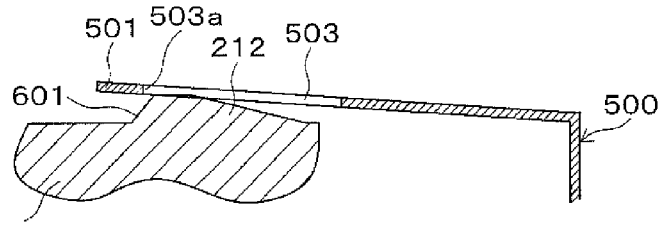
FIGS. 11A to 11G are cross sectional views showing modifications of the embodiment.
Figure 11B:
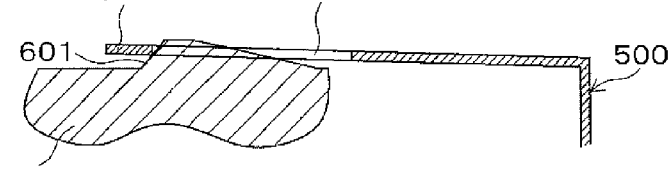
Figure 11C:
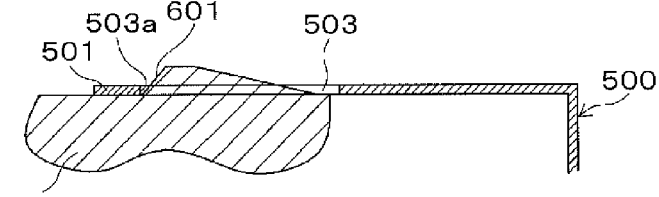

Variations of the click portion 212 are explained hereinafter. FIGS. 11A to 11G show schematic views of engaging conditions of the click portion 212 with the arm portion 501 when viewed from the circumferential direction. FIGS. 11A to 11C show an embodiment in which the click portion 212 has a taper-shaped portion 601 which contacts an edge 503a of the hole portion 503 of the arm portion 501. The taper-shaped portion 601 has a cross section that has a downhill inclination toward the front plate 210 when viewed from the circumferential direction. According to the structure, as shown in FIGS. 11B and 11C, accumulated tolerance of the parts in the axial direction is absorbed by the taper-shaped portion 601 and generation of a gap is inhibited. That is, when accumulated tolerance of the parts in the axial direction causes the condition shown in FIG. 11B or FIG. 11C, since the taper-shaped portion 601 has an inclination, the condition in which the hole portion 503 is hung to the click portion 212 is maintained.

Figure 11D:
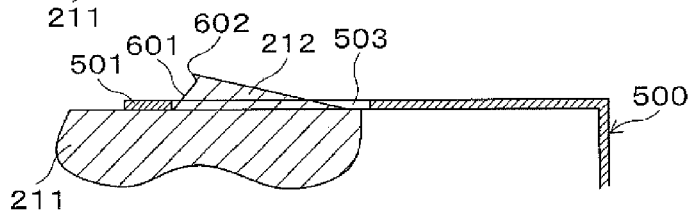

FIG. 11D shows an embodiment in which the taper-shaped portion 601 has a projection 602 projecting axially at the outermost position from the axis. In this structure, the engaging condition in which the hole portion 503 is hung to the click portion 212 is not easily released due to the projection 602.

Figure 11E:
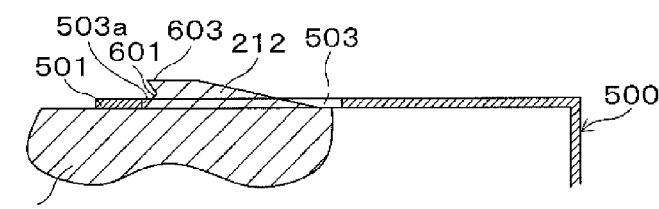
Figure 11F:
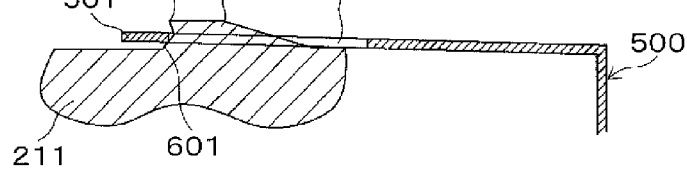

FIG. 11E show an embodiment in which a projection 603 is provided. The projected length of the projection 603 is longer than that of the projection 602. FIG. 11F shows a condition in which the end of the arm portion 501 is slightly floating from the condition shown in FIG. 11E due to accumulated tolerance of the parts in the axial direction. In this condition, the end of the arm portion 501 moves along the inclined surface of the taper-shaped portion 601, as shown in FIG. 11F, the engaging condition of the click portion 212 with the hole portion 503 is maintained.

Figure 11G:
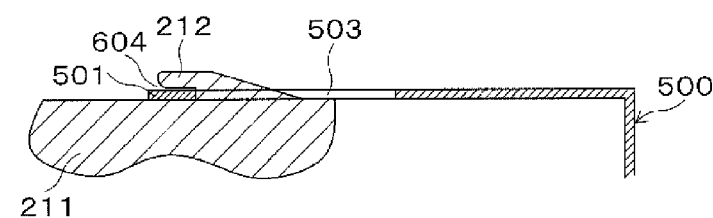

FIG. 11G show an embodiment in which the click portion 212 is provided with a recessed portion 604 that is axially concave. In this structure, the end of the arm portion 501 is hung to the recessed portion 604. In this structure, the engaging condition of the click portion 212 with the hole portion 503 is not easily released. In the cases shown in FIGS. 11D and 11E, the lower side portion of the projections 602 and 603 may function as a recessed portion.

The embodiment of the present invention is not limited to each of the above embodiments and includes various modifications that may be anticipated by a person skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

The present invention can be used for stepping motors.

What is claimed is:

1. A stepping motor comprising:
   a first plate;
   a second plate having a side facing the first plate and a reverse side;
   a stator held by the first plate and the second plate axially;
   plural band connecting portions provided in the first plate, disposed at a side surface of the stator, extending toward the second plate and having an engaging portion at an outer side thereof; and
   a band portion contacting the reverse side of the second plate, extending toward the first plate, and having plural arm portions engaging respective engaging portions of the band connecting portion;
   wherein the band portion is connected to the first plate while holding the second plate and the stator therebetween by engaging the plural arm portions with the engaging portions,
   the band portion is elastically deformed, the deformation causes tensile force that is generated in the arm portions so as to pull the band connecting portions toward the band portion.

2. The stepping motor according to claim 1, wherein the second plate has a relief portion allowing the elastic deformation of the band portion.

3. The stepping motor according to claim 2, wherein the band portion has a reverse surface portion contacting the reverse side of the second plate and the plural arm portions axially extending from an outer ridge of the reverse surface portion,
the second plate has a ridge portion facing a boundary between the plural arm portions and the reverse surface portion, the ridge portion has a shape in which the surface thereof is recessed, and the recessed surface functions as the relief portion.

4. The stepping motor according to claim 1, wherein the stator has a projection or a recess, the first plate and the second plate have a recess or a projection, and the stator, the first plate, and the second plate are positioned by closely fitting the projection and the recess.

5. The stepping motor according to claim 1, wherein one of the band portion and the band connecting portion has a click portion, and the other of the band portion and the band connecting portion has a hanging portion, the click portion being hung in the hanging portion.

6. The stepping motor according to claim 5, wherein the click portion has a contacting portion contacting the hanging portion, and the contacting portion has a projection projecting axially at the outermost position from the center of the axis.

7. The stepping motor according to claim 5, wherein the click portion has a contacting portion contacting the hanging portion, and the contacting portion has a recessed portion that is axially concave.

8. The stepping motor according to claim 1, wherein the plural arm portions are made of an elastic material, and when the plural arms are elastically deformed, the band portion can be removed from a condition engaging with the band connecting portion.

9. The stepping motor according to claim 1, wherein the stator has a cylindrical shape, the stepping motor further comprises a rotor that is rotatably contained inside the stator, and rubber washers that are disposed between the rotor and the first plate and disposed between the rotor and the second plate.

10. The stepping motor according to claim 1, wherein the plural engaging portion and the plural arm portions are disposed at equiangular positions when viewed axially.

* * * * *